(12) United States Patent
Zilberstein et al.

(10) Patent No.: US 7,649,452 B2  
(45) Date of Patent: Jan. 19, 2010

(54) PROTECTION OF CONTROL NETWORKS USING A ONE-WAY LINK

(75) Inventors: Amir Zilberstein, Yad Rambam (IL); Lior Frenkel, Rehovot (IL)

(73) Assignee: Waterfall Solutions Ltd., Rosh Haayin (IL)

( * ) Notice: Subject to any disclaimer, the term of this patent is extended or adjusted under 35 U.S.C. 154(b) by 297 days.

(21) Appl. No.: 11/823,950

(22) Filed: Jun. 29, 2007

(65) Prior Publication Data  
US 2009/0002150 A1    Jan. 1, 2009

(51) Int. Cl.  
G08B 1/00 (2006.01)

(52) U.S. Cl. ...................... 340/531; 709/245

(58) Field of Classification Search ............ 340/531; 370/487; 702/188; 709/238–240, 245; 726/3  
See application file for complete search history.

(56) References Cited

U.S. PATENT DOCUMENTS

| | | | |
|---|---|---|---|
| 6,049,611 A | 4/2000 | Tatebay et al. | |
| 6,289,377 B1 * | 9/2001 | Lalwaney et al. | 709/245 |
| 6,317,831 B1 | 11/2001 | King | |
| 6,963,817 B2 * | 11/2005 | Ito et al. | 702/188 |
| 7,260,833 B1 * | 8/2007 | Schaeffer | 709/238 |
| 7,324,515 B1 * | 1/2008 | Chapman | 370/487 |
| 2006/0259431 A1 | 11/2006 | Poisner | |
| 2007/0203970 A1 * | 8/2007 | Nguyen | 709/201 |

OTHER PUBLICATIONS www.waterfall.co.il , Aug. 10, 2008.  
www.msisac.org , Aug. 10, 2008.  
Dudi Einav, "Waterfall IP Surveillance Enabler", Jul. 2007.

* cited by examiner

Primary Examiner—John A Tweel, Jr.  
(74) Attorney, Agent, or Firm—Husch Blackwell Sanders Welsh & Katz

(57) ABSTRACT

A method for monitoring a process includes receiving a signal from a sensor that is indicative of a physical attribute associated with the process and transmitting data indicative of the received signal over a one-way link. The transmitted data received from the one way link are used in monitoring the process.

22 Claims, 2 Drawing Sheets

PROTECTION OF CONTROL NETWORKS USING A ONE-WAY LINK

FIELD OF THE INVENTION

The present invention relates generally to computerized monitoring systems, and specifically to prevention of unauthorized access to such systems.

BACKGROUND OF THE INVENTION

In a computer network handling sensitive data, such as data in military or financial environments, portions of the network may be connected by one-way data links. The term "one-way link" is used in the context of the present patent application and in the claims to refer to a communication link that is physically configured to carry signals in one direction and to be incapable of carrying signals in the opposite direction. For example, confidential data that must not be accessed from external sites may be stored on a computer that is configured to receive data over a one-way link and has no physical outgoing link over which data might be transmitted to the external site.

One-way links may be implemented, for example, using Waterfall™ systems, which are manufactured by Gita Technologies, Ltd. (Rosh HaAyin, Israel). Specifications of Waterfall systems are available at www.waterfall.co.il. The Waterfall system provides a physical one-way connection based on fiberoptic communication, using an underlying proprietary transfer protocol. When a transmitting computer is connected by a Waterfall system (or other one-way link) to a receiving computer, the receiving computer can receive data from the transmitting computer but has no physical means of sending any return communications to the transmitting computer.

Supervisory Control And Data Acquisition (SCADA) systems are commonly deployed for purposes of data collection and, in some cases, control in a wide variety of different process environments. Typically, as the name implies, SCADA systems are used for supervisory purposes, and are not critical to real-time control of the process (which is generally carried out by a real-time automated control system, separate from the SCADA system). Common SCADA applications include monitoring and control of industrial processes, infrastructure operations, and facility conditions. Although the term "SCADA" is sometimes used to refer specifically to large-scale distributed monitoring and control systems, in the context of the present patent application this term denotes any sort of supervisory monitoring system that is separate from the facility or process being monitored. The term "facility" is used broadly herein to refer generally to any and all sorts of premises, equipment and apparatus that may be monitored by such a SCADA system. The term "process" is likewise defined broadly to refer to any sort of sequence of physical operations and/or events that produces an identifiable outcome.

Recently, there have been mounting concerns regarding the security of SCADA-based systems and the vulnerability of such systems to cyber-terrorism. Security vendors, such as Check Point® Software Technologies (Ramat Gan, Israel) and Innominate Security Technologies AG (Berlin, Germany), have begun to address these risks by developing lines of specialized industrial firewall and virtual private network (VPN) solutions for SCADA networks. In addition, the Multi-State Information Sharing and Analysis Center (www.msisac.org), with support from the U.S. Department of Homeland Security, has developed guidelines, known as the *Cyber Security Procurement Language for Control Systems*, for SCADA system security. These guidelines cover topics including the removal of unnecessary services and programs, minimum firewall requirements for perimeter security, and disabling or modifying guest and other well-known accounts.

SUMMARY OF THE INVENTION

SCADA systems typically comprise one or more computers, which are connected by a communication link to the facility being monitored. It frequently occurs that at least one of these SCADA computers has a connection, such as an Internet link, to other computers outside the SCADA system and the monitored facility. One of the major security concerns regarding SCADA systems is that a hacker may use this sort of outside connection to hack into the SCADA computer, and from there take control of the monitored facility.

Embodiments of the present invention provide systems and methods based on one-way links, which may be used to address these sorts of security concerns. In some of these embodiments, a SCADA system receives monitoring data from the monitored facility via a one-way link. The SCADA system is unable to transmit any sort of data back to the monitored facility (although a separate, open-loop connection may be provided for this purpose), and therefore cannot be used as the base for an attack on the facility. Typically, a transmit proxy collects data regularly from sensors and actuators in the facility and transmits the data over the one-way link to a receive proxy, from which the SCADA system may access the data on command without having to communicate directly with the facility.

Although embodiments of the present invention are described herein with reference to SCADA systems, the term "SCADA" is used broadly, as defined in the Background section above, and the principles of the present invention may be used in supervisory monitoring of substantially any sort of facility or process.

There is therefore provided, in accordance with an embodiment of the present invention, a method for monitoring a process, including:

receiving a signal from a sensor that is indicative of a physical attribute associated with the process;

transmitting data indicative of the received signal over a one-way link; and receiving and processing the transmitted data from the one way link in order to monitor the process.

The method may include outputting a report indicative of the monitored process. Typically, transmitting the data includes sending the data from a facility in which the process occurs over the one-way link to a location at which the process is monitored, which is remote from the facility.

In some embodiments, receiving the signal includes collecting signals from a plurality of sensors at a transmit proxy, which transmits the data corresponding to the collected signals over the one-way link. Typically, receiving the transmitted data includes mirroring the data corresponding to the collected signals at a receive proxy, and providing the mirrored data to a computer for the processing. In a disclosed embodiment, collecting the signals includes communicating between the transmit proxy and the sensors using a predetermined monitoring protocol, and providing the mirrored data includes emulating the monitoring protocol at the receive proxy in communication with the computer.

Typically, receiving the signal includes collecting the signal from the sensor over a local network in a facility, wherein the local network has an exit for transmission of the data via the one-way link but has no entrance from outside the facility. In some embodiments, processing the transmitted data includes generating an instruction to adjust the process, and the method includes transmitting the instruction to an operator of the process over an auxiliary link that is not connected to the local network.

There is also provided, in accordance with an embodiment of the present invention, apparatus for monitoring a process, including:

a plurality of sensors, which are configured to generate respective signals that are indicative of physical attributes associated with the process;

a one-way link; and a transmission controller, which is coupled to receive the signals from the sensors and to transmit data indicative of the signals over the one-way link.

The apparatus may include a computer, which is coupled to receive and process the transmitted data from the one-way link so as to monitor the process. In a disclosed embodiment, the apparatus includes a local network connecting the sensors with the transmission controller, wherein the local network, sensors and transmission controller are located in a facility, and wherein the one-way link serves as an exit from the local network for transmission of the data to the computer outside the facility, but the local network has no entrance from outside the facility. The computer may be configured to generate an instruction to adjust the process, and including an auxiliary link that is not connected to the local network for transmission of the instruction to an operator in the facility.

There is additionally provided, in accordance with an embodiment of the present invention, apparatus for monitoring a process, including:

a one-way link;

a transmit proxy, which is configured to collect data indicative of physical attributes associated with the process from a plurality of sensors, and to transmit the collected data over the one-way link; and a receive proxy, which is coupled to the one-way link so as to receive and mirror the data collected by the transmit proxy so as to provide the mirrored data to a computer for processing.

There is further provided, in accordance with an embodiment of the present invention, apparatus for communication in a facility, the apparatus including:

a local network, which is configured to communicate with a plurality of data sources that are deployed in the facility, so as to collect data from the data sources; and a one-way link, for conveying the collected data out of the local network to a computer outside the facility, wherein the one-way link serves as an exit from the local network for transmission of the collected data to the computer, but the local network has no entrance from outside the facility.

In a disclosed embodiment, the apparatus includes an auxiliary link that is not connected to the local network for transmission of an instruction from the computer to an operator within the facility.

The present invention will be more fully understood from the following detailed description of the embodiments thereof, taken together with the drawings in which:

DETAILED DESCRIPTION OF EMBODIMENTS

Figure 1:
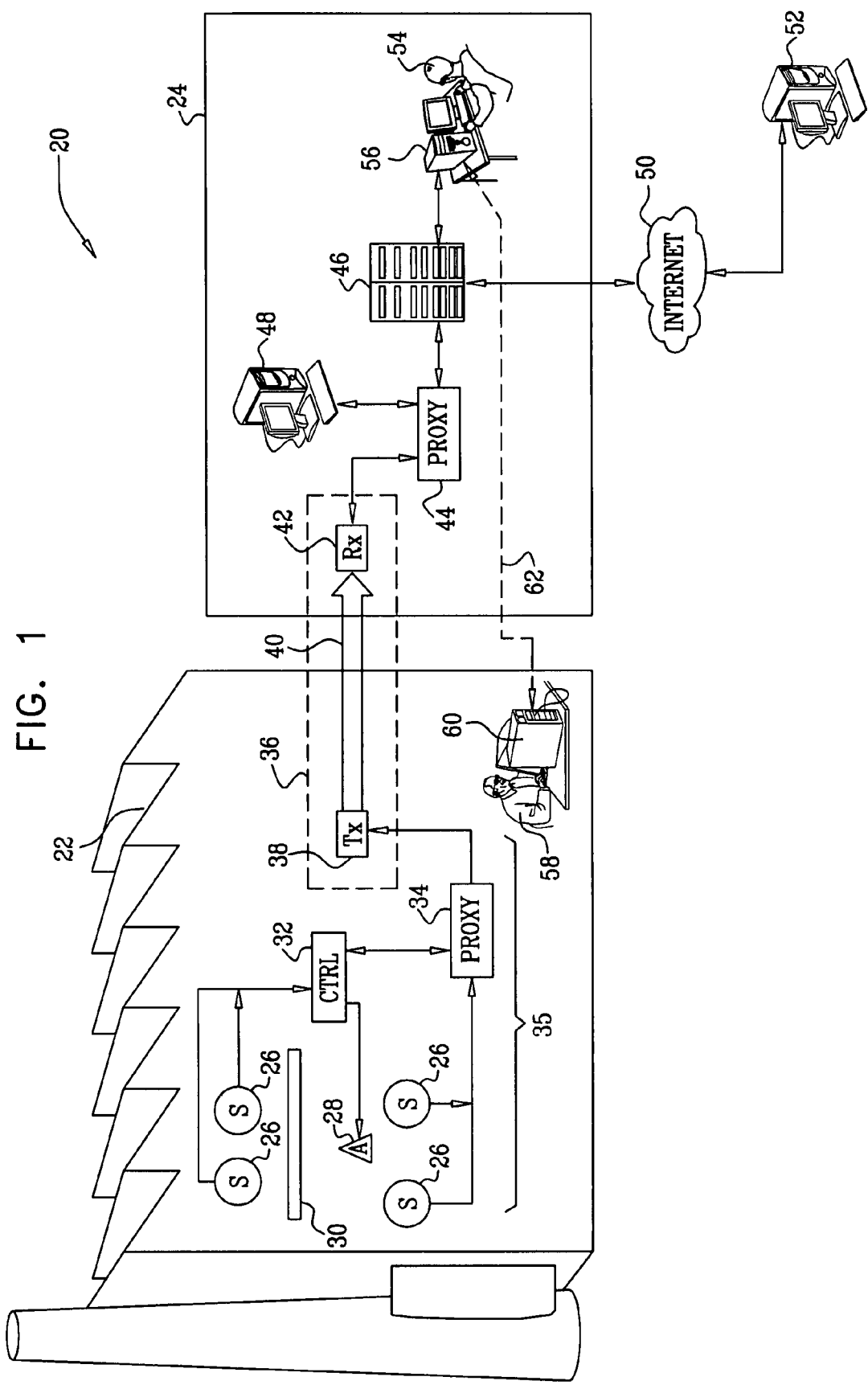
FIG. 1 is a block diagram that schematically illustrates a SCADA system, in accordance with an embodiment of the present invention.

FIG. 1 is a block diagram that schematically illustrates a SCADA system 20, in accordance with an embodiment of the present invention. The system is used in this embodiment in monitoring and, optionally, controlling a process carried out in an industrial facility 22. The particular configuration of FIG. 1, however, is shown solely by way of example, and the principles of the present invention may similarly be applied in supervisory monitoring and control of substantially any sort of process, equipment or operations, in substantially any sort of facility. The supervisory monitoring functions in this embodiment are carried out in a control center 24, which is connected to industrial facility 22 by a one-way link 36, as described in detail hereinbelow. Although facility 22 and control center 24 are shown in FIG. 1 as separate entities, connected remotely by link 36, in other embodiments (not shown in the figures) the control center and one-way link may be located in the same premises as the facility being monitored.

Facility 22 contains various sensors 26 and actuators 28, which operate on a product 30 or other object of the process in question, or on the process environment generally. The term "sensor," as used in the context of the present patent application and in the claims, refers to any sort of device that responds to a physical stimulus (such as heat, light, sound, pressure, motion, flow, temperature, chemical concentration, etc.), and produces a corresponding output signal. The signals generated by the sensors in facility 22 are indicative of physical attributes associated with the process. An "actuator," on the other hand, is a device that receives an input signal and, in response, performs a certain physical action. Typically, one or more local controllers 32 monitor the sensor outputs and control the actuators accordingly in real-time. The local controllers, sensors and actuators may comprise any suitable types of devices that are known in the art, which may be connected and communicate among themselves using any suitable sort of infrastructure and protocol over a local network 35 (which may comprise wired and/or wireless links). The signals produced and received by the sensors and actuators may be either analog or digital signals. In the context of network 35 and system 20, the sensors, actuators and local controllers may be seen as data sources.

A transmit proxy 34 serves as a transmission controller for one-way link 36 and as the "local presence" of SCADA system 20 in facility 22. The transmit proxy collects data from sensors 26 and actuators 28, either directly or via controller 32, over local network 35 within facility 22. The term "collects" is used in the present patent application and in the claims to include both passive reception of data output by the elements on network 35 and active querying or polling of these elements. Typically, the transmit proxy comprises a computer with suitable input and output interfaces for performing the functions described herein. The term "computer" is used herein to mean any sort of computing device, i.e., a device that has a central processing unit (CPU) and operates, at least in part, under the control of software. Local network 35 is secure, as shown in the figure, in the sense that there is no link or other physical connection of any sort over which any signal originating outside facility 22 can reach any of the elements on the local network. In other words, the local network has an exit, via one-way link 36, but no entrance from outside facility 22.

One-way link 36 comprises a link transmitter 38 and a link receiver 42, connected by a communication medium 40. The link transmitter receives data provided by transmit proxy 34 and transmits the data over medium 40. Link 36 may comprise a fiberoptic link, for example, as in the Waterfall device mentioned above. Alternatively, link 36 may comprise any other suitable sort of one-way link, such as the types of links that are described in PCT Patent Application PCT/IL2006/001499, filed Dec. 28, 2006, which is assigned to the assignee of the present patent application and whose disclosure is incorporated herein by reference. To prevent tampering, transmitter 38 is typically (although not necessarily) located in facility 22, while receiver 42 is located in control center 24, as shown in FIG. 1.

Link receiver 42 transfers the data that it receives to a receive proxy 44 in control center 24. The receive proxy typically comprises a computer with suitable input and output interfaces for performing the functions described herein. Transmit proxy 34 and receive proxy 44 may be arranged to communicate so that the receive proxy contains a mirror image of the data collected by the transmit proxy, with prompt updating of the mirrored data when changes occur in facility 22. A SCADA server 46 in control center 24 is thus able to receive data that it needs from receive proxy 44 regarding sensors 26 and actuators 28 without any direct communication with facility 22. Alternatively, the functions of the receive proxy may be integrated into the SCADA server.

Receive proxy 44 may also serve other computers that require monitoring and control data regarding facility 22. These computers may be deployed inside control center 24, such as a computer 48, or outside the control center and connected to communicate with the monitoring facility via a network 50, such as a computer 52, which communicates with server 46 via the public Internet. Because the only data path between local network 35 in facility 22 and computers 48 and 52 is via one-way link 36, a hacker will be unable to gain control of the equipment in facility 22 via any of these computers. (At worst, the hacker may be able to interfere with the operation of the SCADA system, but not with the operational facility that the SCADA system is monitoring.)

In the configuration shown in FIG. 1, SCADA system 20 is blocked, for the security reasons explained above, from providing any inputs directly to the equipment in facility 22. The automatic functions of the SCADA system are thus limited to monitoring. In some situations, however, it may be desirable for the SCADA system to provide instructions to facility 22 based on the information transmitted over link 36 and/or other inputs or conditions. For this purpose, an operator 54 of the SCADA system may communicate with an operator 58 of facility 22 via a separate auxiliary link 62. This link may comprise a data link between respective terminals 56 and 60 that are used by the operators. Alternatively or additionally, link 62 may comprise a voice link. Further alternatively or additionally, operator 58 may receive communications automatically from server 46. In any case, link 62 terminates at operator 58 or terminal 60 and does not connect to local network 35 in facility 22. Therefore, the hacker also cannot use link 62 to gain control of the equipment in facility 22. Upon receiving instructions over link 62, operator 58 may use a suitable authentication protocol to verify that the instructions are legitimate before putting them into effect.

Figure 2:
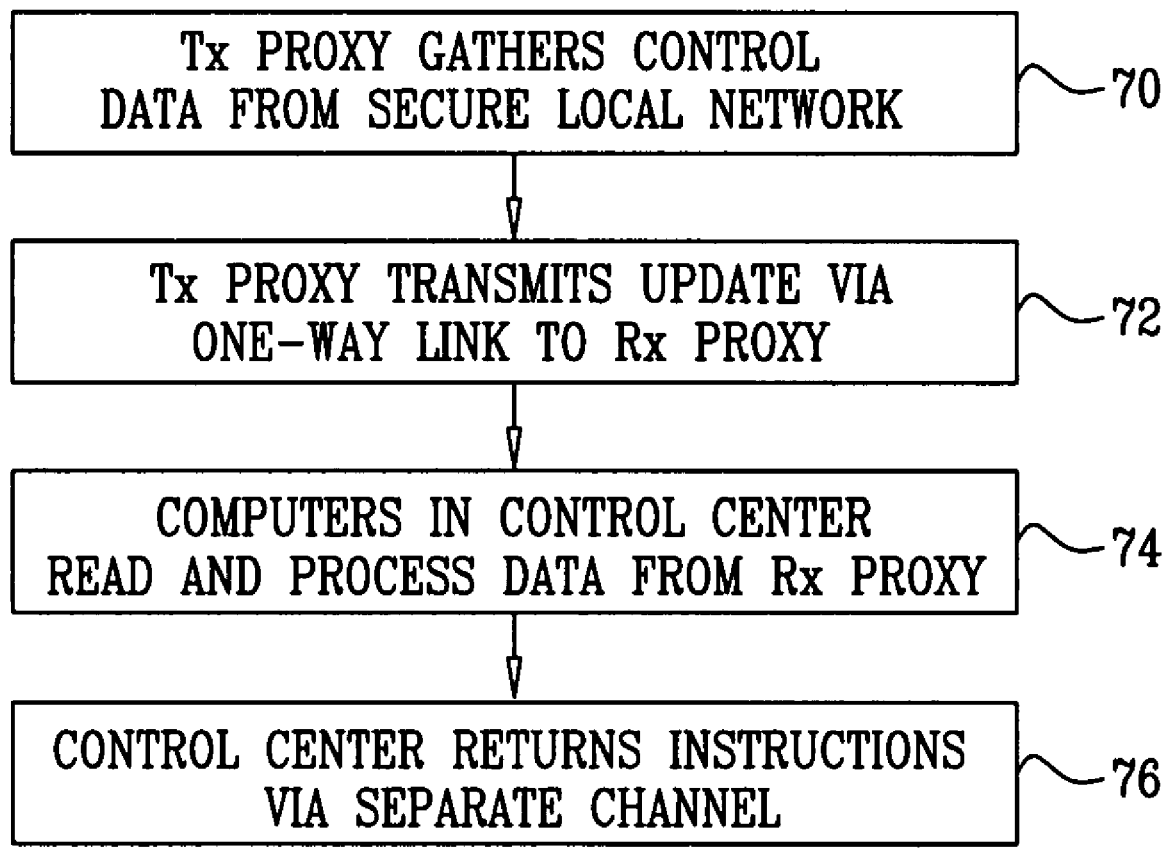
FIG. 2 is a flow chart that schematically illustrates a method for monitoring and controlling a facility, in accordance with an embodiment of the present invention.

FIG. 2 is a flow chart that schematically illustrates a method for monitoring and, optionally, controlling facility 22, in accordance with an embodiment of the present invention. As noted earlier, although this method is described herein with reference to the particular system configuration and components shown in FIG. 1, the description makes reference to these elements solely for the sake of illustration. The principles of this method may similarly be used in other monitoring applications. Furthermore, although the steps in the method of FIG. 2 are shown, for conceptual clarity, as occurring sequentially, in practice these steps typically go on continually, in parallel, during the operation of the SCADA system.

Following the initial set-up of system 20 and facility 22, transmit proxy 34 acquires data from sensors 26 and actuators 28 via network 35, at a data acquisition step 70. Typically, proxy 34 is configured to poll or otherwise collect the data using a standard protocol, in a manner that emulates conventional SCADA systems. As a result, the secure monitoring configuration of system 20 may be applied to facility 22 without requiring changes in the hardware or software of the standard components (sensors, actuators and local controllers) that are used in the facility. Transmit proxy 34 may be programmed to periodically collect all data generated by the components in facility 22, or for greater efficiency, the transmit proxy may be programmed to collect the specific items of data that are required by SCADA software running on server 46.

As transmit proxy 34 receives new data from facility 22, it transmits data updates via one-way link 36 to receive proxy 44, at a data transmission step 72. The transmit proxy may simply transmit all the data that it receives or, for greater efficiency, it may limit transmission to data items that have changed. As noted above, step 72 causes the receive proxy to maintain a mirror of the data on the transmit proxy.

Computers in control center 24, such as server 46, access the data on receive proxy 44, at a data access step 74. The receive proxy may present the data to server 46 in a standard format, using existing protocols, so that legacy SCADA programs running on the server need not be modified substantially to operate in the environment of system 20. The receive proxy may be programmed to emulate the protocols used for data exchange on network 35, so that the server receives data (either by polling or push transmission) from "virtual devices" on the receive proxy as though it were receiving the data from the actual sensors and actuators in facility 22.

Server 46 logs the data that it receives from proxy 44, and uses the data to monitor the process in facility 22 and to generate reports as appropriate. The reports may be output via terminal 56, for example. In some cases, the server may determine that a change is needed in the operational settings of one or more actuators or other devices in facility 22. In such cases, the server generates a report and, if urgent, an alarm to operator 54, indicating the change that is required. Operator 54 reviews the report and, if necessary, sends instructions via auxiliary channel 62 to operator 58 in facility 22, at step 76. Alternatively, as noted earlier, the instructions may be generated and transmitted automatically by server 46. In response to these instructions, operator 58 may make the necessary adjustments.

Although embodiments of the present invention were described hereinabove with reference to SCADA system 20 and facility 22, the principles of the present invention may be applied in supervisory monitoring of substantially any sort of premises, equipment, process or operation. It will thus be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method for monitoring a process, comprising:
receiving a signal from a sensor that is indicative of a physical attribute associated with the process;
transmitting data indicative of the received signal over a one-way link; and
receiving and processing the transmitted data from the one way link in order to monitor the process.

2. The method according to claim 1, and comprising outputting a report indicative of the monitored process.

3. The method according to claim 1, wherein transmitting the data comprises sending the data from a facility in which the process occurs over the one-way link to a location at which the process is monitored, which is remote from the facility.

4. The method according to claim 1, wherein receiving the signal comprises collecting signals from a plurality of sensors at a transmit proxy, which transmits the data corresponding to the collected signals over the one-way link.

5. The method according to claim 4, wherein receiving the transmitted data comprises mirroring the data corresponding to the collected signals at a receive proxy, and providing the mirrored data to a computer for the processing.

6. The method according to claim 5, wherein collecting the signals comprises communicating between the transmit proxy and the sensors using a predetermined monitoring protocol, and wherein providing the mirrored data comprises emulating the monitoring protocol at the receive proxy in communication with the computer.

7. The method according to claim 1, wherein receiving the signal comprises collecting the signal from the sensor over a local network in a facility, wherein the local network has an exit for transmission of the data via the one-way link but has no entrance from outside the facility.

8. The method according to claim 6, wherein processing the transmitted data comprises generating an instruction to adjust the process, and comprising transmitting the instruction to an operator of the process over an auxiliary link that is not connected to the local network.

9. Apparatus for monitoring a process, comprising:
a plurality of sensors, which are configured to generate respective signals that are indicative of physical attributes associated with the process;
a one-way link; and
a transmission controller, which is coupled to receive the signals from the sensors and to transmit data indicative of the signals over the one-way link.

10. The apparatus according to claim 9, and comprising a computer, which is coupled to receive and process the transmitted data from the one-way link so as to monitor the process.

11. The apparatus according to claim 10, and comprising a local network connecting the sensors with the transmission controller, wherein the local network, sensors and transmission controller are located in a facility, and wherein the one-way link serves as an exit from the local network for transmission of the data to the computer outside the facility, but the local network has no entrance from outside the facility.

12. The apparatus according to claim 11, wherein the computer is configured to generate an instruction to adjust the process, and comprising an auxiliary link that is not connected to the local network for transmission of the instruction to an operator in the facility.

13. The apparatus according to claim 9, wherein the one-way link is configured to connect a facility in which the sensors are deployed with a location at which the process is monitored, which is remote from the facility.

14. The apparatus according to claim 9, wherein the transmission controller comprises a transmit proxy, which is configured to hold the data that is indicative of the signals received from the sensor, and wherein the apparatus comprises a receive proxy, which is coupled to receive the data transmitted over the one-way link and is configured to mirror the data held by the transmit proxy so as to provide the mirrored data to a computer for processing.

15. The apparatus according to claim 14, wherein the transmit proxy is configured to communicate with the sensors using a predetermined monitoring protocol, and wherein the receive proxy is configured to emulate the monitoring protocol in communication with the computer.

16. Apparatus for monitoring a process, comprising:
a one-way link;
a transmit proxy, which is configured to collect data indicative of physical attributes associated with the process from a plurality of sensors, and to transmit the collected data over the one-way link; and
a receive proxy, which is coupled to the one-way link so as to receive and mirror the data collected by the transmit proxy so as to provide the mirrored data to a computer for processing.

17. The apparatus according to claim 16, wherein the transmit proxy is configured to communicate with the sensors using a predetermined monitoring protocol, and wherein the receive proxy is configured to emulate the monitoring protocol in communication with the computer.

18. The apparatus according to claim 16, wherein the one-way link is configured to connect a facility in which the sensors are deployed with a location at which the process is monitored, which is remote from the facility.

19. Apparatus for communication in a facility, the apparatus comprising:
a local network, which is configured to communicate with a plurality of data sources that are deployed in the facility, so as to collect data from the data sources; and
a one-way link, for conveying the collected data out of the local network to a computer outside the facility,
wherein the one-way link serves as an exit from the local network for transmission of the collected data to the computer, but the local network has no entrance from outside the facility.

20. The apparatus according to claim 19, and comprising:
a transmit proxy, which is coupled between the local network and the one-way link so as to hold and transmit the collected data over the one-way link; and
a receive proxy, which is coupled to receive the data transmitted over the one-way link and is configured to mirror the data held by the transmit proxy so as to provide the mirrored data to the computer for processing.

21. The apparatus according to claim 19, wherein the data sources comprise sensors, which are configured to generate respective signals that are indicative of physical attributes associated with a process carried out in the facility.

22. The apparatus according to claim 19, and comprising an auxiliary link that is not connected to the local network for transmission of an instruction from the computer to an operator within the facility.

* * * * *